US006624257B2

(12) United States Patent
Yoshida et al.

(10) Patent No.: US 6,624,257 B2
(45) Date of Patent: Sep. 23, 2003

(54) METHOD OF QUANTIFYING PROTECTIVE RATIO OF HYDROXYL GROUPS OF POLYMER COMPOUND

(75) Inventors: Masami Yoshida, Osaka (JP); Isao Yoshida, Ikeda (JP); Satoshi Yamaguchi, Toyonaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/931,769

(22) Filed: Aug. 20, 2001

(65) Prior Publication Data

US 2002/0052449 A1 May 2, 2002

(30) Foreign Application Priority Data

Aug. 23, 2000 (JP) ........................................ 2000-252130

(51) Int. Cl.[7] .................................................. C08F 8/00
(52) U.S. Cl. .................... 525/383; 525/383.3; 525/385; 525/386
(58) Field of Search ................................. 525/383, 385, 525/386

(56) References Cited

U.S. PATENT DOCUMENTS

| 5,468,589 A | 11/1995 | Urano et al. ................ 430/170 |
| 5,525,381 A | * 6/1996 | Bouteiller et al. ..... 252/299.01 |
| 5,558,971 A | 9/1996 | Urano et al. ................ 430/170 |
| 5,558,976 A | 9/1996 | Urano et al. ................ 430/326 |
| 5,578,827 A | * 11/1996 | Wolf et al. ............ 250/339.04 |
| 5,670,299 A | 9/1997 | Urano et al. ................ 430/326 |
| 5,955,538 A | * 9/1999 | Sun ............................ 525/370 |

FOREIGN PATENT DOCUMENTS

| JP | 05-249682 | 9/1993 |
| JP | 08-123032 | 5/1996 |
| JP | 10-147614 | 6/1998 |

* cited by examiner

*Primary Examiner*—Bernard Lipman
(74) *Attorney, Agent, or Firm*—Sughrue Mion, PLLC (57) ABSTRACT

A method of quantifying the protection ratio of a hydroxyl group of a polymer compound, comprising calculating the protection ratio of a hydroxyl group of a polymer compound using a multiple regression calibration curve obtained by regression-analyzing main components of near infrared absorption spectra of a plurality of standards samples, from near infrared absorption spectra of samples containing a polymer compound composed of the following first structural unit and second structural unit:

first structural unit: a structural unit of a structure having a hydroxyl group, second structural unit: a structural unit of a structure obtained by introducing a protective group into a hydroxyl group in the first structural unit. By this method, the protection ratio of a hydroxyl group of the polymer compound contained in a sample can be quantified with high precision in a short period of time without isolating the polymer compound.

5 Claims, 5 Drawing Sheets

METHOD OF QUANTIFYING PROTECTIVE RATIO OF HYDROXYL GROUPS OF POLYMER COMPOUND

BACKGROUND OF THE INVENTION

The present invention relates to the method of quantifying protective ratio of the hydroxyl groups of a polymer compound.

A polymer compound composed of the following first structural unit and second structural unit is useful, for example, as a resin component of a photoresist:

first structural unit: a structural unit with a structure having a hydroxyl group, second structural unit: a structural unit with a structure obtained by introducing a protective group into the hydroxyl group in the first structural unit.

In such a polymer compound, the protective ratio of the hydroxyl groups showing content ratio of the first structural unit to the second structural unit is important. As a highly precise quantitative method such a protective ratio, quantitative methods according to an NMR method are known in which quantification is effected from a nuclear magnetic resonance (NMR) spectrum of a polymer compound (JP-A Nos. 5-249682, 8-123032, 10-147614 and the like).

However, the quantitative method according to an NMR method has a problem that measurement of an NMR spectrum requires a comparatively longer period of time. Further, when the polymer compounds are contained together with foreign materials in the measuring sample, the NMR spectrum is need to be measured, after a previous treatment of isolating the polymer compound from the sample mixture.

As a quantitative method that can quantify the protective ratio of the hydroxyl groups of the polymer compound In a short period (of time) without isolating a polymer compound from the sample mixtures the quantitative method according to a thermal decomposition gas chromatograph method is exemplified, in which the sample is thermally decomposed and the yielded fragments are measured by a gas chromatography. This method, however, is not a precise quantitative method since the polymer compound is thermally decomposed for quantification.

The present inventors have intensively studied to develop a quantitative method which can quantify the protective ratio of the hydroxyl groups of the polymer compound at high precision in a short period of time without isolating the polymer compound from the measuring sample, and resultantly found that the protective ratio of the hydroxyl groups of the polymer compound contained in the sample can be quantified at high precision in a short period of time even if the sample contains foreign materials, by calculating the protective ratio from the near infrared absorption spectrum of the sample containing the polymer compound using a multiple regression calibration curve obtained by analyzing the main components of the near infrared absorption spectra of a plurality of standard samples. Thus, the present invention was completed.

SUMMARY OF THE INVENTION

The present invention provides a method of quantifying the protective ratio of the hydroxyl groups of the polymer compound, comprising calculating the protective ratio of the hydroxyl groups of the polymer compound using a multiple regression calibration curve obtained by regression-analyzing the main components of the near infrared absorption spectra of a plurality of standards samples, from the near infrared absorption spectra of samples containing the polymer compound composed of the following first structural unit and second structural unit:

first structural unit: a structural unit of the structure having a hydroxyl group, second structural unit: a structural unit of the structure obtained by Introducing a protecting group into a hydroxyl group in the first structural unit.

EMBODIMENTS OF THE INVENTION

A sample applied in the quantitative method of the present invention contains a polymer compound composed of the above-mentioned first structural unit and second structural unit.

The first structural unit is a structural unit of the structure having a hydroxyl group. Examples of such a structural unit include structural units having a phenolic hydroxyl group such as a structural unit of the general formula (I), and the like.

(I)

The second structural unit is a structural unit with the structure obtained by introducing a protecting group Into a hydroxyl group in the first structural unit. As the protecting group, for example, alkoxyalkyl groups, alkylcarbonyl groups, arylcarbonyl groups, alkyl groups, alkoxycarbonyl groups and the like are listed. As the alkoxyalkyl group, for example, an ethoxyethyl group, cyclohexyloxyethyl group, ethoxypropyl group and the like are listed. As the alkylcarbonyl group, for example, a pivaloyl group and the like are listed, as the arylcarbonyl group, for example, a benzoyl group and the like are listed. As the alkyl group, for example, a methyl group, ethyl group, isopropyl group and the like are listed. As the alkoxycarbonyl group, for example, a t-butyloxycarbonyl group and the like are listed, resectively. Such protecting groups may be one kind or two or more kinds.

When the first structural unit is a structural unit of the above-mentioned general formula (I), the second structural unit is a structural unit of the general formula (II):

(II)

wherein, z represents a protecting group.

Such a polymer compound composed of a first structural unit and a second structural unit may contain other structural units. Examples of the other structural unit include an acrylic acid unit, methacrylic acid unit, t-butyl acrylate unit, t-butyl methacrylate unit, cyclohexyl acrylate unit, cyclohexyl methacrylate unit, adamantly acrylate unit, adamantly methacrylate unit, 2-hydroxyadamantyl acrylate unit, 2-hydroxyadamantyl methacrylate unit, 2-methyladamantyl acrylate unit, 2-methyladamantyl methacrylate unit, 2-ethyladamantyl acrylate unit, 2-ethyladamantyl methacrylate unit, 1-(1'-adamantyl)methylethyl acrylate unit, 1-(1'-adamantyl)methylethyl methacrylate unit, styrene unit and the like.

Such a polymer compound can be produced, for example, by methods in which a protecting agent is reacted with a raw material polymer compound composed of a first structural unit (JP-A Nos. 5-249682,8-123032, 10-147614, and the like). According to such methods, the protecting group can be introduced into the hydroxyl groups of a raw material polymer, and the first structural unit is converted into a second structural unit to obtain the polymer compound composed of the first structural unit and the second structural unit.

Further, they can also be produced by methods in which a protecting group is released from a raw material polymer compound composed of a second structural unit (JP-A Nos. 5-249682, 8-123032, 10-147614 and the like). According to these methods, the protecting group in the raw material compound is released, and the second structural unit is converted into the first structural unit. Resultantly, the polymer compound composed of a first structural unit and a second structural unit can be obtained.

The quantitative method of the present invention is a method of quantifying the protective ratio of the hydroxyl groups of the polymer compound composed of a first structural unit and a second structural unit The quantitative method of the present invention will be illustrated below using an example of quantifying the protective ratio of the hydroxyl groups of the polymer compound contained in a reaction mixture during the reaction in the above-mentioned production method.

A sample used in the quantitative method of the present invention may be a reaction mixture during the above-mentioned reaction, or are action mixture after completion of the reaction. A sample containing such a polymer compound can be collected from the reaction mixture by an ordinary method, such as a method using a pipette or a microsyringe. A sample after measured a near infrared absorption spectrum may be returned to the reaction system. Further, the measuring sample may be collected from the reaction mixture continuously. In this cases the sample after measured is usually returned to the reaction mixture continuously.

In the quantitative method of the present invention, a polymer compound isolated from a reaction mixture during the reaction or after completion of the reaction may also be used as a sample.

The near infrared absorption spectrum (x) of a sample can be measured by using usual infrared spectral analysis apparatuses, for example, a wavelength dispersion type infrared spectral analysis apparatus, Fourier transformation type infrared spectral analysis apparatus (FT-IR apparatus) and the like. The measurement wave number range is usually selected in the range from about 12500 to 4000 $cm^{-1}$.

The resulted spectrum (x) is converted into the protective ratio (y) of the hydroxyl groups of the polymer compound using a multiple regression calibration curve. The multiple regression calibration curve can be obtained by regression-analyzing the main components of the near infrared absorption spectra of a plurality of standards samples. Specifically, it can be obtained by regression-analyzing the main components according to the following [Procedure 1] to [Procedure 7] using a computer, for example.

[Procedure 1]

A procedure of obtaining a matrix [N] according to the formula (1-1) from the protective ratio (nil) of the hydroxyl groups of the polymer compound contained in N standard samples.

$$[N] = \begin{bmatrix} n_{11} & n_{21} & \cdots & n_{N1} \\ n_{12} & n_{22} & \cdots & n_{N2} \\ \vdots & \vdots & \ddots & \vdots \\ n_{1M} & n_{2M} & \cdots & n_{NM} \end{bmatrix} \quad (1\text{-}1)$$

[Procedure 2]

A procedure of obtaining a matrix [R] in which near infrared absorption spectra ($r_1$) of N standard samples are used as column vectors and $r_i$s are arranged in column.

[Procedure 3]

A procedure of obtaining a matrix [U] in which eigenvectors ($u_j$) of an auto-correlated matrix [R] [R]$^t$ of [R] obtained from a matrix [R] and a transposed matrix [R]$^t$ thereof are arranged in column, a matrix [V] in which eigenvectors ($v_m$) of an auto-correlated matrix [R]$^t$[R] of [R]$^t$ are arranged in column, and a diagonal matrix [Λ] in which an inherent value ($λ_p$) of an auto-correlated matrix [R][R]$^t$ is a diagonal element, respectively.

[Procedure 4]

A procedure of obtaining a matrix [N'] according to the formula (4-1):

$$[N']=[N][V][\Lambda]^{-1}[U]^{-1}[R] \quad (4\text{-}1)$$

from [N], [V], an inverse matrix [Λ]$^{-1}$ of [Λ], an inverse matrix [U]$^{-1}$ of [U], and [R].

[Procedure 5]

A procedure of obtaining an error (a) calculated according to the formula (5-1):

$$e = \sum_{i=1}^{N} \{(n'_{i1} - n_{i1})^2 / N\} \quad (5\text{-}1)$$

from element $n_{i1}$ of [N] and element $n'_{i1}$ of [N'] at any of i.

[Procedure 6]

A procedure of obtaining an error (e) according to the calculations in the above-mentioned procedures 2 to 5 and so selecting the wave number range of the spectrum ($r_i$) used for calculation and previous treatments performed on the spectrum ($r_i$) as to minimize the error (e), instead of the wave number range of the spectrum ($r_i$) and the previous treatments performed on the spectrum ($r_i$) used in the above-mentioned procedure 2.

[Procedure 7]

A procedure of obtaining a matrix [T] showing a multiple regression calibration curve, according to the formula (7-1):

$$[T]=[M][V][\Lambda]^{-1}[U]^{-1} \tag{7-1}$$

using [V], $[\Lambda]^{-1}$ and $[U]^{-1}$ and [N], calculated by performing the previous treatment selected in the above-mentioned procedure 6 on the spectrum ($r_i$) of the wave number range selected in the above-mentioned procedure 6.

Figure 1:
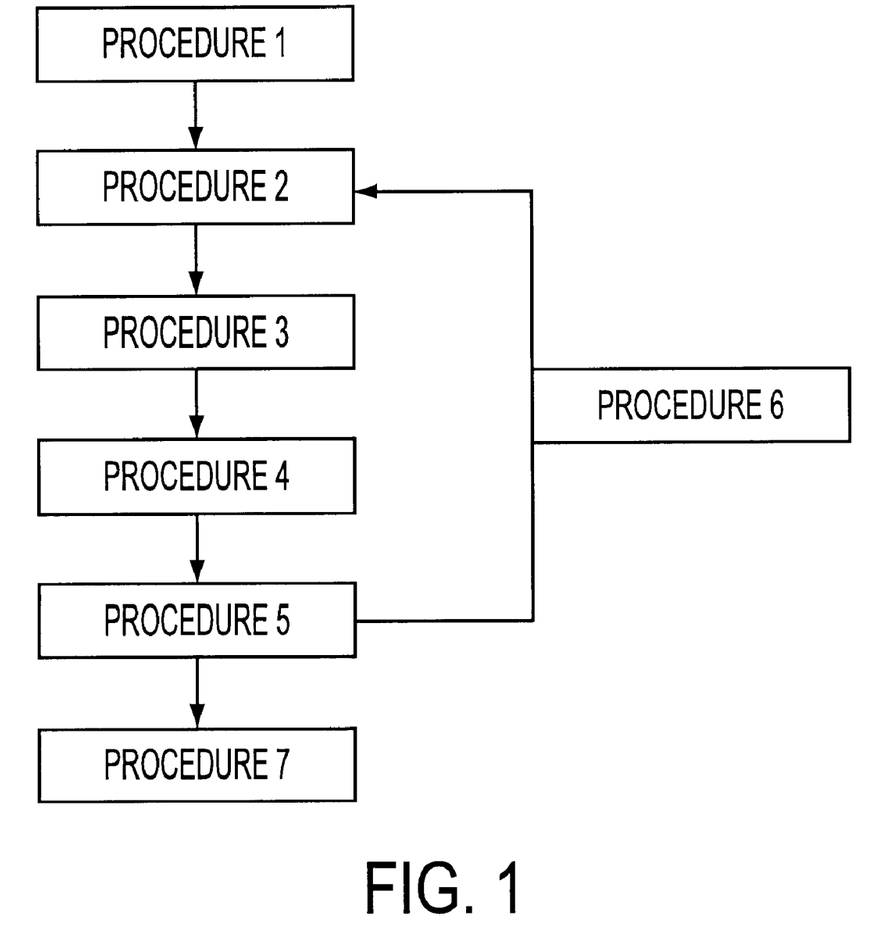
FIG. 1 is a view showing relation between [Procedure 1] to [Procedure 7].

The relation of the above-mentioned [Procedure 1] to [Procedure 7] is shown in FIG. 1.

[Procedure 1] to [Procedure 7] are described in detail below.

[Procedure 1]

A procedure of obtaining a matrix [N] according to the formula (1-1) from the protective ratio ($n_{i1}$) of the hydroxyl groups of the polymer compound contained in N standard samples.

The protective ratio of the hydroxyl groups of the polymer compound contained in a standard sample is known. In a matrix [N] of the formula (1-1), N is the number of standard samples, and i represents a natural number of 1 to N. M represents the rank described later of an auto-correlated matrix $[R][R]^t$ obtained from a matrix [R] and a transposed matrix $[R]^t$ of the matrix [R], namely a number of inherent values other than 0, and an inherent value which is less than dispersion of noises of the spectrum ($r_i$) may be regarded as 0, from the standpoint of calculation. Of elements of the matrix [N], $n_{i1}$ represents the protective ratio (y) of the hydroxyl groups of the polymer compound contained in each standard sample, and for example, it is a value defined by the formula (1):

$$y=N_2/(N_1+N_2) \tag{1}$$

from the number ($N_1$) of hydroxyl groups in a first structural unit and the number ($N_2$) of protecting groups in a second structural unit of a polymer compound. Such a protective ratio (y) can be quantified at high precision, for example, by an NMR method and the like. Other elements $n_i k$ (k represents a natural number of 2 to M) of the matrix [N] are variations independent with each other of standard samples, and examples of the variation include the reaction initial concentration of a raw material polymer compound, the degree of polymerization of a raw material polymer compound, the content of other structural units when they are contained in a raw material polymer compound, the concentration of a protecting agent used, the concentration of a by-product, the formulation ratio of a mixed solvent when the solved used in the reaction is composed of a mixture of a plurality of solvents, and the like. When the number of variations in standard samples is less than M, $n_i k$ may be the same value other than 0, for example 1, in calculation, and in this case, the value of an error (e) obtained in the procedure 5 tends to be deviated from 0. Basically, M is smaller than N, and when M coincides with N, N, namely the number of standard samples, may be advantageously be increased.

[Procedure 2]

A procedure of obtaining a matrix [R] in which near infrared absorption spectra ($r_i$) of N standard samples are used as column vectors and $r_i$s are arranged in line.

The near infrared absorption spectra ($r_i$) of N standard samples are column vectors represented by the formula (2-1):

$$r_i = \begin{bmatrix} r_{i1} \\ r_{i2} \\ \vdots \\ r_{iH} \end{bmatrix} \tag{2-1}$$

in which the absorbance at h-$^{th}$ wave number is represented by $r_{ih}$, and H represents the number of wave numbers measured. The matrix [R] is a matrix represented by the formula (2-2):

$$[R] = (r_1, r_2, \ldots, r_N) = \begin{bmatrix} r_{11} & r_{21} & \cdots & r_{N1} \\ r_{12} & r_{22} & \cdots & r_{N2} \\ \vdots & \vdots & \ddots & \vdots \\ r_{1H} & r_{2H} & \cdots & r_{NH} \end{bmatrix} \tag{2-2}$$

At any of i, the spectrum ($r_i$) may be a spectrum itself measured, or a wave-length range maybe previously restricted, or previous treatments, for example, base line correcting treatments such as a treatment of subtracting the average value, and the like, a back ground treatment, a smoothing treatment, differentiation treatments such as primary differentiation, secondary differentiation, tertiary differentiation and the like may also be performed. These previous treatments are conducted alone or in combination of two or more.

[Procedure 3]

A procedure of obtaining a matrix [U] in which eigenvectors ($u_j$) of an auto-correlated matrix $[R][R]^t$ of [R] obtained from a matrix [R] and a transposed matrix $[R]^t$ thereof are arranged in column, a matrix [V] in which eigenvectors ($v_m$) of an auto-correlated matrix $[R]^t[R]$ of $[R]^t$ are arranged in column, and a diagonal matrix $[\Lambda]$ in which an inherent value ($\lambda_p$) of an auto-correlated matrix $[R][R]^t$ is a diagonal element, respectively.

The eigenvectors ($u_j$) and ($v_m$) and inherent value ($\lambda_p$) can be obtained by numerical calculation using a computer. Each of j, m and p is a natural number of 1 to M.

[U] is a matrix represented by the formula (3-1):

$$[U] = (u_1, u_2, \ldots, u_m) = \begin{bmatrix} u_{11} & u_{21} & \cdots & u_{M1} \\ u_{12} & u_{22} & \cdots & u_{M2} \\ \vdots & \vdots & \ddots & \vdots \\ u_{1H} & u_{2H} & \cdots & u_{MH} \end{bmatrix} \tag{3-1}$$

[V] is a matrix represented by the formula (3-2):

$$[V] = (v_1, v_2, \ldots, v_m) = \begin{bmatrix} v_{11} & v_{21} & \cdots & v_{M1} \\ v_{12} & v_{22} & \cdots & v_{M2} \\ \vdots & \vdots & \ddots & \vdots \\ v_{1N} & v_{2N} & \cdots & v_{MN} \end{bmatrix} \quad (3\text{-}2)$$

[Λ] is a matrix represented by the formula (3-3):

$$[\Lambda] = \begin{bmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_M \end{bmatrix} \quad (3\text{-}3)$$

In the formulae, $\lambda_p$, satisfies the formula (3-4);

$$\lambda_1 > \lambda_2 > \lambda_M > 0 \quad (3\text{-}4),$$

the eigenvector ($u_j$) satisfies the formula (3-5) at any of j:

$$|u_j|=1 \quad (3\text{-}5),$$

the eigenvector ($v_m$) satisfies the formula (3-6) at any of m:

$$|v_m|=1 \quad (3\text{-}6),$$

the matrix [U] satisfies the formula (3-7):

$$[R][R]^t = [U][\Lambda][\Lambda][U]^t \quad (3\text{-}7)$$

the matrix [V] satisfies the formula (3-8):

$$[R]^t[R] = [V][\Lambda][\Lambda][V]^t \quad (3\text{-}8).$$

[Procedure 4]

A procedure of obtaining a matrix [N'] according to the formula (4-1) from [N], [V], an inverse matrix $[\Lambda]^{-1}$ of [Λ], an inverse matrix $[U]^{-1}$ of [U], and [R].

The inverse matrices $[\Lambda]^{-1}$ and $[U]^{-1}$ can be obtained by a numerical calculation method using computer, and the like, from [Λ] and [U].

[Procedure 5]

A procedure of obtaining an error (e) calculated according to the formula (5-1) from element $n_{i1}$ of [N] and element $n'_{i1}$ of [N'] at any of i.

The element $n_{i1}$ of [N] is a measured value of the protective ratio (y) of each standard sample, and the element $n'_{i1}$ of [N'] is a calculated value of the protective ratio (y) from the spectrum ($r_i$) and eigenvector ($u_j$) of each standard sample. Under ideal conditions wherein the spectrum ($r_i$) contains no noise, element $n_{i1}$ of [N] and element $n'_{i1}$ of [N'] coincide mathematically and an error (e) is 0. However, since the actual spectrum ($r_i$) contains noises, a measured value ($n_{i1}$) of the protective ratio and a calculated value (n'i1) of the protective ratio according to the formula (4-1) do not coincide mathematically, and the error (e) usually manifests a value other than 0, namely, a value larger than 0.

[Procedure 6]

A procedure of obtaining an error (e) by the calculations according to the above-mentioned procedures 2 to 5 and so determining the wave number range of the spectrum ($r_i$) of a standard sample used for calculation and previous treatments, as to minimize the error (e), instead of the wave number range of the spectrum ($r_i$) of a standard sample and the previous treatments used in the above-mentioned procedure 2.

When the wave number range of the spectrum ($r_i$) used in calculation is wider, the precision of calculation of the protective ratio ($n'_{i1}$) can be increased, however, longer time is required for calculation with increase in the memory capacity of a computer necessary for calculation of a multiple regression calibration curve. Reversely, when the wave number range is narrower, precision for calculation of the protective ratio ($n'_{i1}$) lowers. Therefore, the wave number range of the spectrum ($r_i$) used for calculation is appropriately selected in view of the memory capacity and calculation speed of a computer used, and the intended precision of the protective ratio (y).

As the previous treatment of the spectrum ($r_i$), the same treatments as described above for the procedure 2, for example, base line correcting treatments such as a treatment of subtracting the average value, and the like, a back ground treatment, a smoothing treatment, differentiation treatments such as primary differentiation, secondary differentiation, tertiary differentiation and the like are listed. These previous treatments are used singly or in combination of two or more.

[Procedure 7]

A procedure of obtaining a matrix [T] showing a multiple regression calibration curve, according to the formula (7-1). using [V], $[\Lambda]^{-1}$ and $[U]^{-1}$ and [N], calculated by performing the previous treatment selected in the above-mentioned procedure 6 on the data (absorbance) of the wave number range selected in the above-mentioned procedure 6 of the spectrum ($r_i$).

In main component regression-analysis in the above-mentioned [Procedure 1] to [Procedure 7], the protective ratio (y) is defined by the formula (1) in [Procedure 1]. Alternatively, the protective ratio (y) may also be defined by the formula (2):

$$y = N_1/(N_1+N_2) \quad (2)$$

instead of the formula (1).

Further, the protective ratio (y) may also be defined as a ratio of number of the second structural units to the total number of the first structural units, the second structural units and the other structural units, or as a ratio of number of the first structural units to the total number.

In [Procedure 5], an error (e) is calculated by the formula (5-1) and in [Procedure 6], the wave number range of the spectrum ($r_i$) for calculation and previous treatments are so determined as to minimize this error (e). Alternatively, it may also be permissible that a correlation coefficient between element $n_{i1}$ of [N] and element $n'_{i1}$ of [N'] at any of i is obtained instead of the above-mentioned error (e), and in [Procedure 6], the wave number range of the spectrum ($r_i$) for calculation and previous treatments are so determined that this correlation coefficient comes nearest to 1.

In the quantitative method of the present invention, the protective ratio (y) is calculated from the near infrared absorption spectrum (x) of a sample using thus obtained multiple regression calibration curve (matrix [T]).

The near infrared absorption spectrum (x) of a sample is a column vector represented by the formula (3):

$$x = \begin{bmatrix} x_1 \\ x_2 \\ \vdots \\ x_H \end{bmatrix} \quad (3)$$

in which the absorbance of the h-$^{th}$ wave number is represented by $x_h$. The protective ratio (y) is calculated, for example, by a substitution of the near infrared absorption spectrum (x) in the relation formula among the protective ratio (y), the near infrared absorption spectrum (x) and the multiple regression calibration curve (matrix [T]). More concretely, the protective ratio (y) may be calculated as the first element ($w_l$) of a column vector (w) calculated according to the formula (4);

$$w = \begin{bmatrix} w_1 \\ w_2 \\ \vdots \\ w_M \end{bmatrix} \quad (4)$$
$$= [T]x$$

using the near infrared absorption spectrum (x) of a Sample and the matrix [T] obtained in the above-mentioned procedure 7.

The protective ratio (y) thus obtained from a multiple regression calibration curve has a precision equivalent to the protective ratio quantified by the same quantitative method used for quantification of the protective ratio of the hydroxyl groups of a polymer compound contained in a standard sample, and coincides with the protective ratio quantified by an NMR method when the protective ratio of the hydroxyl groups of the polymer compound contained in a standard sample is quantified by a quantitative method according to an NMR method as exemplified in the above-mentioned description.

According to the quantitative method of the present invention, the protective ratio of the hydroxyl groups of a polymer compound contained in a sample can be measured quickly with high precision without isolating the polymer compound from a sample even if the sample contains foreign materials. Therefore, the polymer compound having the intended protective ratio can be obtained easily, it, for example, in production of a polymer compound composed of a first structural unit and a second structural unit by reacting a raw material polymer compound composed the above-mentioned first structural unit with a protecting agent, the protective ratio of the hydroxyl groups of the polymer compound contained in a reaction mixture is calculated, using the above-mentioned multiple regression calibration curve, from the near infrared absorption spectrum (x) of there action mixture during the reaction, and the reaction is terminated based on the resulted protective ratio.

For terminating the reaction based on the resulted protective ratio, if the protective ratio (y) is defined by the formula (1), the reaction may be terminated when the protective ratio (y) reaches the intended value, and the reaction is continued when the protective ratio (y) is smaller than the intended value. Further, if the protective ratio(y)is defined by the formula (2), the reaction may be terminated when the protective ratio (y) reaches the intended value, and there action is continued when the protective ratio (y) is larger than the intended value.

For terminating the reaction, for example, the reaction mixture may be cooled to temperature lower than the reaction temperature, or a reaction terminating agent may be added. For continuing the reaction, when the protecting agent is consumed to exhaustion, the protecting agent is added. The reaction of a raw material polymer compound with a protecting agent is usually conducted in a solvent, and can also be conducted in the presence of a catalyst. A raw material polymer compound may also contain a second structural unit if the amount thereof is smaller than the amount in the intended polymer. Further, when a raw material polymer compound contains other structural unit, a polymer compound composed of a first structural unit, second structural unit and other structural unit can be obtained.

Further, a polymer compound having the intended protective ratio can be obtained easily, if, in production of a polymer compound composed of a first structural unit and a second structural unit by releasing the protective groups from a raw material polymer compound composed of the above-mentioned second structural unit, the protective ratio of the hydroxyl groups of the polymer compound contained in a reaction mixture is calculated, using the above-mentioned multiple regression calibration curve, from the near infrared absorption spectrum (x) of there action mixture during the reaction, and the reaction is terminated based on the resulted protective ratio.

In production of a polymer compound composed of a first structural unit and a second structural unit by releasing a protective group from a raw material polymer compound composed of the above-mentioned second structural unit, for terminating the reaction based on the resulted protective ratio, if the protective ratio (y) is defined by the formula (1), the reaction may be terminated when the protective ratio (y) reaches the intended value, and there action is continued when the protective ratio (y) is larger than the intended value. Further, if the protective ratio (y) is defined by the formula (2), the reaction may be terminated when the protective ratio (y) reaches the intended value, and the reaction is continued when the protective ratio (y) is smaller than the intended value.

For terminating the reaction, for example, the reaction mixture may be cooled, or a reaction terminating agent may be added. The reaction of releasing the protecting group from a raw material polymer compounds usually conducted in a solvent, and can also be conducted in the presence of a catalyst. A raw material polymer compound may also contain a first structural unit if the amount thereof is smaller than the amount of the intended polymer. Further, when a raw material polymer compound contains other structural unit. a polymer compound composed of a first structural unit, second structural unit and other structural unit can be obtained.

According to the quantitative method of the present invention, the protective ratio of the hydroxyl groups of the polymer compound contained in a sample can be quantified with high precision in a short period of time without isolating a polymer compound composed of the above-mentioned first structural unit and second structural unit from the sample. Further, since the protective ratio of a polymer compound contained in the reaction mixture can be quickly quantified with high precision during the reaction in producing the above-mentioned polymer compound by a method of reacting a raw material polymer compound composed of a first structural unit with the protecting agent or a method of releasing the protecting group from a raw material polymer compound composed of a second structural unit, the reaction can be terminated based on the protective ratio, and resultantly, a polymer compound having the intended protective ration can be produced easily.

The following examples further illustrate the present invention, but do not limit the scope thereof.

EXAMPLE 1

Preparation of Standard Sample (Lot 1-1)

25 parts by mass of poly(p-vinylphenol) (raw material polymer compound, weight-average molecular weight is 15000 (degree of polymerization is 125)), 0.002 parts by mass of p-toluenesulfonic acid monohydrate (catalyst) and 150 parts by mass of methylisobutylketone (solvent)were mixed and stirred to obtain a reaction mixture. Part of the resulted mixture was collected, and used as a standard sample 1-1 (1 part by mass).

5.1 parts by mass of ethyl vinyl ether (protecting agent) was added dropwise over 30 minutes to the mixture obtained above while stirring. Then, the reaction mixture was collected at 1 hour, 2 hours and 3 hours after completion of addition(0 hour after), while stirring the mixture at 25° C., and the collected samples were used as standard samples 1-2 to 1-4, respectively(1 part by mass).

(Lot 1-2 to Lot 1-6)

The same procedure as described above was repeated except for changing the scale and collecting time as shown in Table 1. Each of the procedures corresponds to Lot 1-2 to Lot 1-6, and the samples collected in Lot 1-2 to Lot 1-6 were used as standard samples 1-5 to 1-21(1 part by mass).

Relations between the standard samples 1-1 to 1-21 and lots and collecting times are shown in Table 1 and Table 2.

(Quantification of Protective Ratio of Standard Sample According to NMR Method)

To 1 part by mass of the resulted standard sample was added 0.1 part by mass of triethylamine and the mixture was stirred, and 5 parts by mass of n-heptane was added to the mixture to precipitate a polymer compound. The precipitated polymer compound (powder body) was filtrated and dried, and $^1$H-NMR spectrum thereof was measured. By the $^1$H-NMR spectrum, production of a polymer compound in which the protective group (ethoxyethyl group) has been introduced into the hydroxyl groups of poly(p-vinylphenol) was confirmed. From the $^1$H-NMR spectrum, the protective ratios ($n_{i1}$, i=1 to 21) of the hydroxyl groups of the polymer compound were measured. The results are shown in Table 1 and Table 2.

(Measurement of Near Infrared Absorption Spectrum of Standard Sample)

Figure 2:
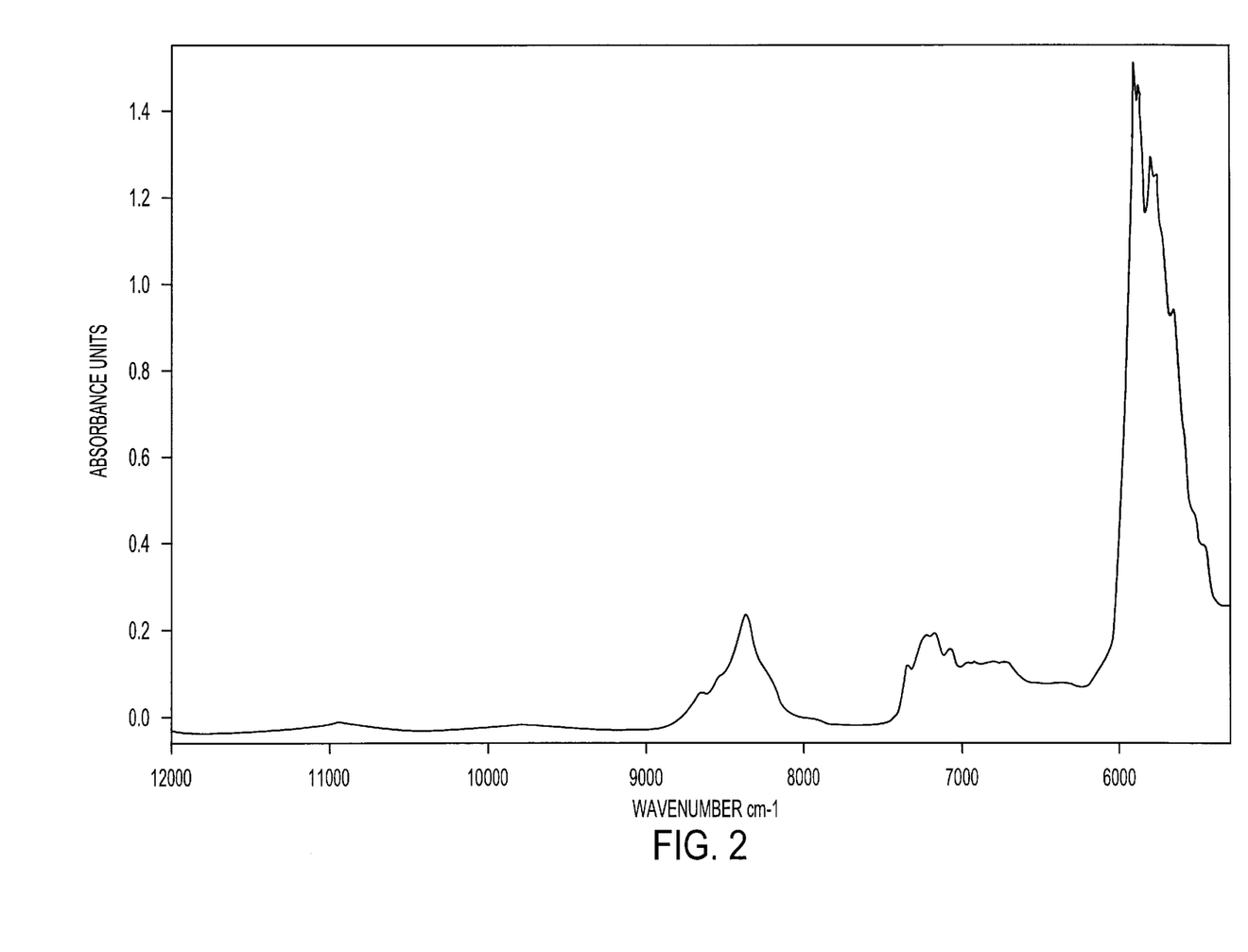
FIG. 2 is a view showing the near infrared absorption spectrum of the standard sample 1-14 prepared in Example 1, wherein the abscissa represents the wave number ($cm^{-1}$, 12000 to 5300 $cm^{-1}$) and the vertical axis represents the absorbance (any unit).
Figure 3:
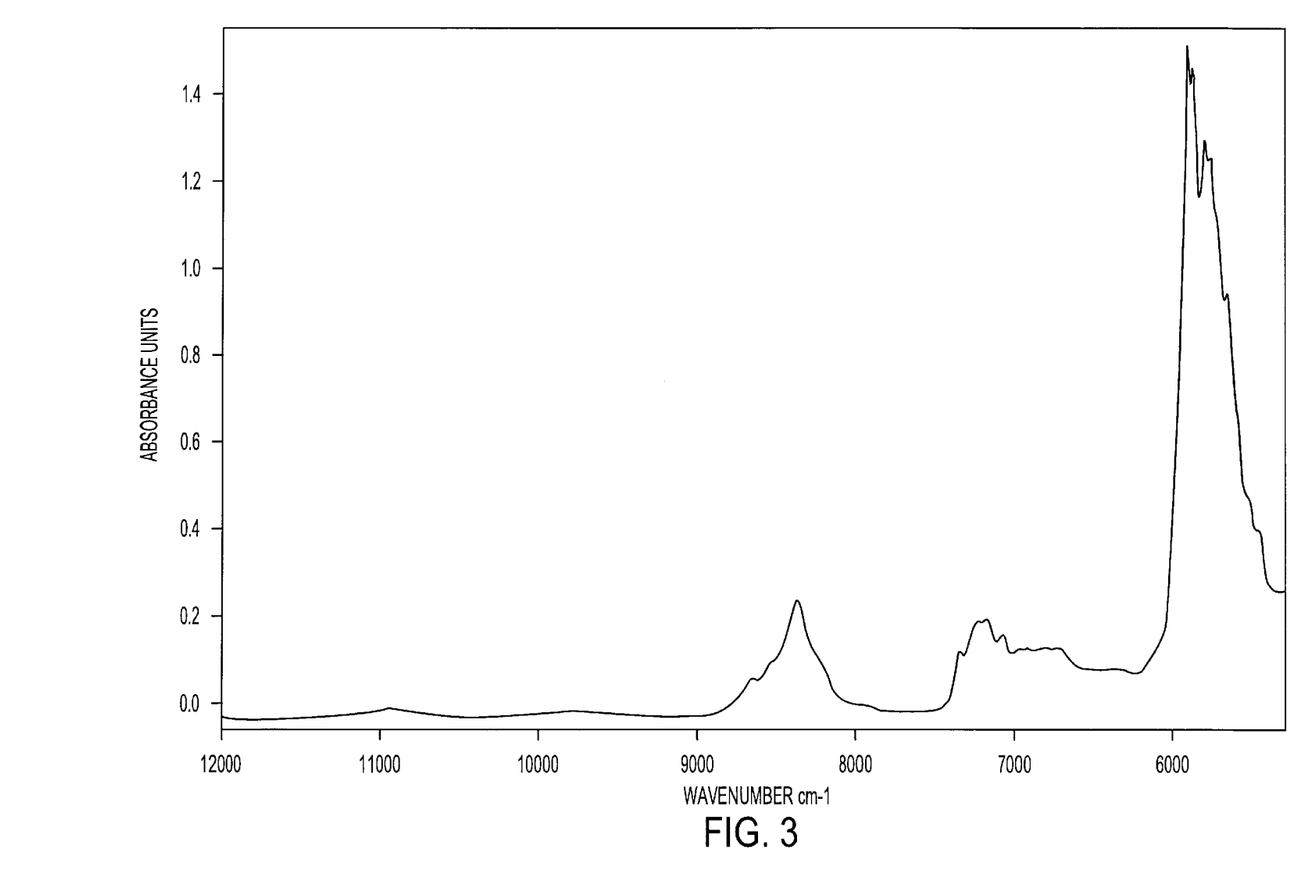
FIG. 3 is a view showing the near infrared absorption spectrum of the standard sample 1-15 prepared in Example 1, wherein the abscissa represents the wave number ($cm^{-1}$, 12000 to 5300 cm–1) and the vertical axis represents the absorbance (any unit).
Figure 4:
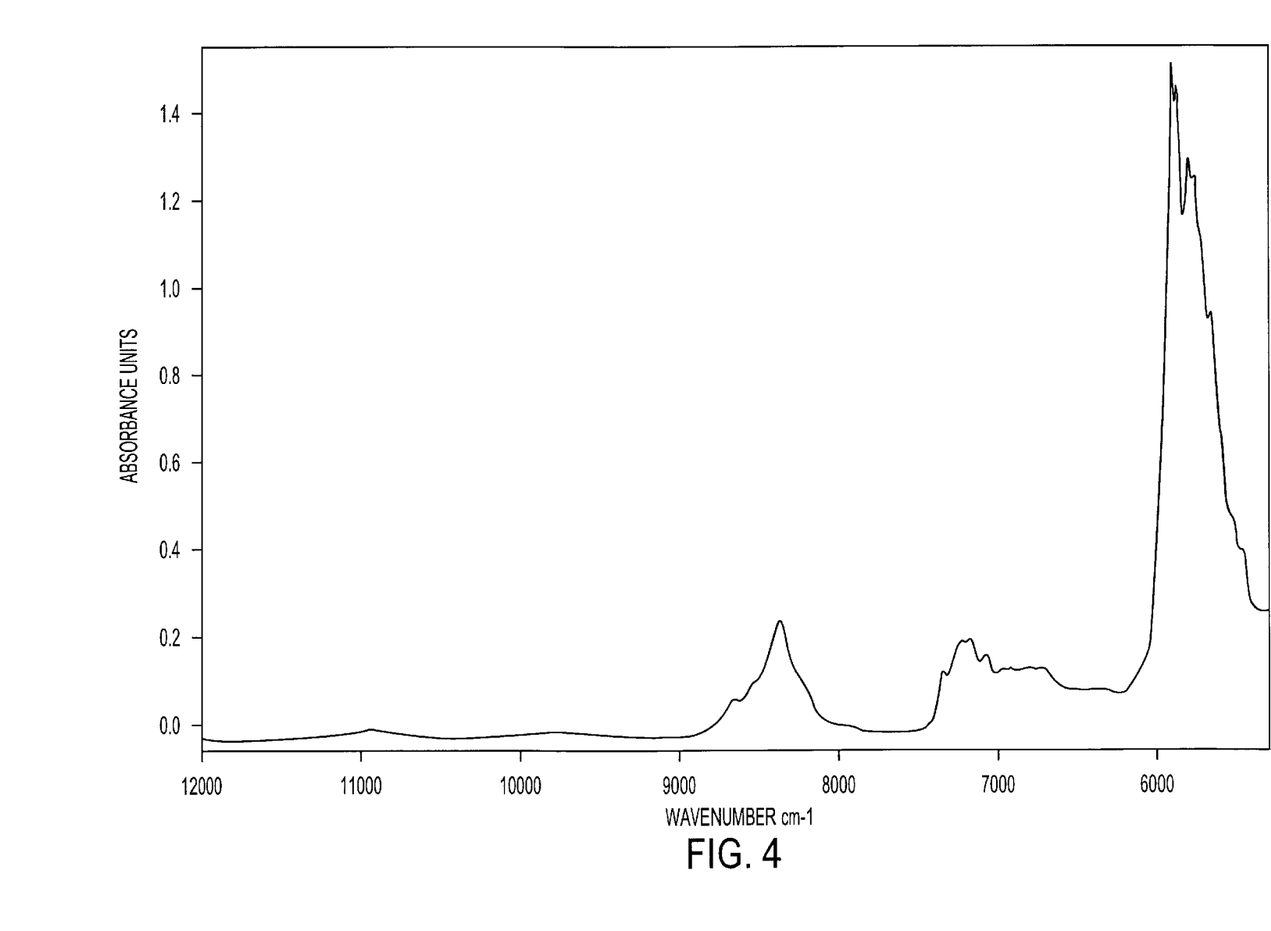
FIG. 4 is a view showing the near infrared absorption spectrum of the standard sample 1-19 prepared in Example 1, wherein the abscissa represents the wave number ($cm^{-1}$, 12000 to 5300 cm–1) and the vertical axis represents the absorbance (any unit).

The near infrared absorption spectra ($r_1$ to $r_{21}$) of standard samples were obtained by using a FT-IR apparatus ["Vector22/N", manufactured by Bruker] by a transmission method in the wave number range from 12000 to 5300 cm$^{-1}$ at a resolution of 2 cm$^{-1}$ and an integration number of 8. Examples of the near infrared absorption spectrum are shown in FIG. 2 (standard sample 14), FIG. 3 (standard sample 15) and FIG. 4 (standard sample 19).

(Making of Multiple Regression Calibration Curve)

A matrix [R], a matrix [U] and a rank (M) were obtained according to Procedures 2 to 3, by setting the wave number range used for calculation of the near infrared absorption spectra ($r_1$ to $r_{21}$) of the standard samples obtained above within the range from 7500 to 5450 cm$^{-1}$ (data number was 1026) and performing base line correction as a previous treatment. M was 8.

A matrix [N] was obtained based on the above-mentioned formula (1-1) using the protective ratios ($n_{i1}$, i=1 to 21) of the standard samples obtained from the $^1$H-NMR spectrum. $n_{ik}$ (i is 1 to 21, k is 2 to 8) was 1.

According to the Procedure 4, [N'] was obtained, and according to the Procedure 5, an error (e) was measured to find it was 0.559.

Figure 5:
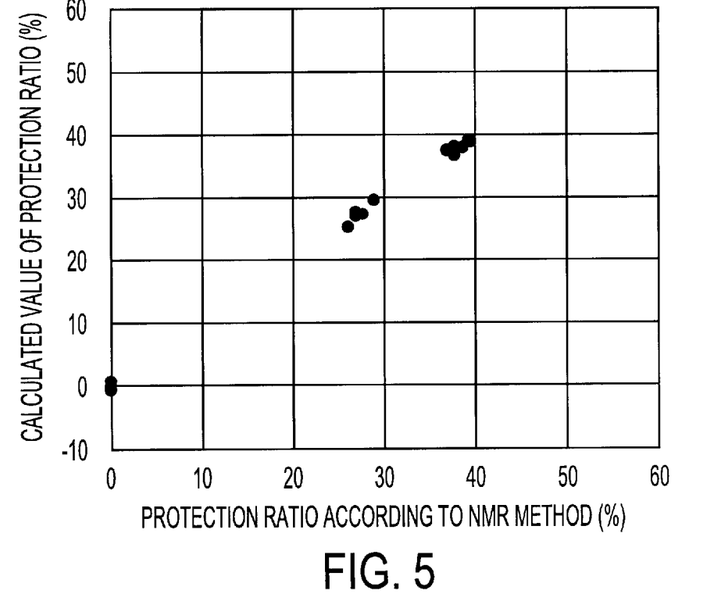
FIG. 5 is a view showing relation between the quantified values (abscissa) of the protective ratios of the standard samples obtained In Example 1 according to an NMR method and the calculated values (vertical axis) of the protective ratios calculated from a multiple regression calibration curve.

The relation of the protective ratios ($n_{i1}$, i=1 to 21) and the elements of the matrix [N'] is shown in FIG. 5. n'i1 are shown in Tables 1 and 2.

TABLE 1

| Standard sample | Lot | Collecting time | Protective ratio (%) $n_{i1}$ | Calculated value of protective ratio n'$_{i1}$ (%) | i |
|---|---|---|---|---|---|
| 1-1 | 1-1 | Before dropwise addition | 0 | 0.41 | 1 |
| 1-2 | 1-1 | 1 hour after | 36.9 | 37.67 | 2 |
| 1-3 | 1-1 | 2 hours after | 37.6 | 36.85 | 3 |
| 1-4 | 1-1 | 3 hours after | 37.5 | 37.14 | 4 |
| 1-5 | 1-2 | Before dropwise addition | 0 | −0.90 | 5 |
| 1-6 | 1-2 | 1 hour after | 27.0 | 27.74 | 6 |
| 1-7 | 1-2 | 2 hours after | 27.0 | 27.53 | 7 |
| 1-8 | 1-2 | 3 hours after | 26.9 | 27.14 | 8 |

TABLE 2

| Standard sample | Lot | Collecting time | Protective ratio (%) $n_{i1}$ | Calculated value of protective ratio n'$_{i1}$ (%) | i |
|---|---|---|---|---|---|
| 1-9 | 1-3 | Before dropwise addition | 0 | −0.90 | 9 |
| 1-10 | 1-3 | 0 hour after | 26.1 | 25.29 | 10 |
| 1-11 | 1-3 | 1 hour after | 37.9 | 37.33 | 11 |
| 1-12 | 1-3 | 2 hours after | 38.2 | 38.39 | 12 |
| 1-13 | 1-3 | 3 hours after | 37.8 | 38.21 | 13 |
| 1-14 | 1-4 | Before dropwise addition | 0 | 0.85 | 14 |
| 1-15 | 1-4 | 0 hour after | 27.0 | 27.50 | 15 |
| 1-16 | 1-4 | 1 hour after | 38.0 | 37.57 | 16 |
| 1-17 | 1-4 | 2 hours after | 38.7 | 38.21 | 17 |
| 1-18 | 1-4 | 3.5 hours after | 39.5 | 39.09 | 18 |
| 1-19 | 1-4 | 3 hours after | 39.2 | 39.08 | 19 |
| 1-20 | 1-5 | 2.5 hours after | 27.7 | 27.40 | 20 |
| 1-21 | 1-6 | 2.5 hours after | 29.1 | 29.32 | 21 |

Then, a matrix [T] showing a multiple regression calibration curve was obtained according to the Procedure 7.

Errors (e) were obtained in the same manner as described above except for changing the wave number range used for calculation of spectra($r_1$ to $r_{21}$), and changing the previous treatments. Any of them was over 0.559.

(Preparation of Sample)

25 parts by mass of poly(p-vinylphenol) (raw material polymer compound, weight-average molecular weight is 15000 (degree of polymerization is 125)), 0.002 parts by mass of p-toluenesulfonic acid monohydrate (catalyst) and 150 parts by mass of methyl isobutyl ketone (solvent) were mixed and stirred to obtain a mixture, and a sample 1-22 (1 part by mass) was collected.

5.1 parts by mass of ethyl vinyl ether (protecting agent) was added dropwise over 30 minutes to the mixture obtained above while stirring. Then, the reaction mixture was collected at completion of addition (0 hour after), 1 hour, 2 hours, or 3 hours after completion of addition, while stirring the mixture at 25° C., and the colleted samples were used as standard samples 1-23 to 1-26 (1 part by mass).

(Quantification of Protective Ratio According to the NMR Method)

$^1$H-NMR spectra of the samples 1-22 to 1-26 were measured in the same manner as for the above-mentioned standard samples, and the protective ratios were obtained. The results are shown in Table 3.

(Quantification of Protective Ratio Using Multiple Regression Calibration Curve)

The near infrared absorption spectra (x) of the samples 1-22 to 1-26 were obtained in the same manner as for the above-mentioned standard samples, and the protective ratios (y) were calculated according to the formula (2) using data within the numerical range from 7500 to 5450 cm$^{-1}$ (data number was 1026) among the spectra (x) and by conducting base line correction as a previous treatment. The results are shown in Table 3. The times required for measurement of the near infrared absorption spectrum were 30 seconds or shorter. In performing the previous treatment on the spectrum (x) and calculating the protective ratio, a usual personal computer was used, and the protective ratio could be calculated approximately in an instant.

TABLE 3

| Sample No. | Collecting time | Protective ratio (%) NMR method | Protective ratio (%) Y |
|---|---|---|---|
| 1-22 | Before dropwise addition | 0 | −0.2 |
| 1-23 | 0 hour after | 9.5 | 7.5 |
| 1-24 | 1 hour after | 25.7 | 25.0 |
| 1-25 | 2 hours after | 27.2 | 27.6 |
| 1-26 | 3 hours after | 27.2 | 27.5 |

As shown in Table 3, the calculated value of the protective ratio calculated using a multiple regression calibration curve from the near infrared absorption spectrum (x) of a sample coincides with the quantified value of the protective ratio according to an NMR method.

EXAMPLE 2

Preparation of Standard Sample (Lot 2-1)

100 parts by mass of a copolymer of p-vinylphenol and cyclohexyl acrylate (raw material polymer compound, weight-average molecular weight is 13000, the molar ratio of the unit derived from p-vinylphenol, the first structural unit, was 90% and the molar ratio of the unit derived from cyclohexyl acrylate, the other structural unit, was 10%), 0.011 parts by mass of p-toluenesulfonic acid monohydrate (catalyst) and 600 parts by mass of methyl isobutyl ketone (solvent) were mixed and stirred to obtain a mixture.

23.4 parts by mass of ethyl vinyl ether (protecting agent) was added dropwise over 30 minutes to the mixture obtained above while stirring. Then, two samples were collected from the reaction mixture each at completion of addition (0 hour after), 1 hour and 2 hours after completion of addition, while stirring the mixture at 25° C., and the collected samples were used as standard samples 2-1 to 2-6(1 part by mass).

Thereafter, same temperature was kept for 1 hour while stirring, and then 1.3 parts by mass of ethyl vinyl ether was added to the reaction mixture while stirring at the same temperature. Two samples were collected from the reaction mixture at 1 hour after completion of the supplemental addition. The collected samples were used as standard samples 2-7 and 2-8(1 part by mass). Relations between the standard samples and collecting times are shown in Table 4.

(Lot 2-2)

The same procedure as in Lot 2-1 was repeated, except for changing the raw material polymer compound to a copolymer of p-vinylphenol and cyclohexyl acrylate (weight-average molecular weight is 13000, the molar ratio of the unit derived from p-vinylphenol, the first structural unit, was 85% and the molar ratio of the unit derived from cyclohexyl acrylate, the other structural unit, was 15%), and changing the amount of ethyl vinyl ether to be added dropwise to 20.1 parts by mass, and the samples thus obtained were used as standard samples 2-9 to 2-18(1 part by mass). Relations between the standard samples and collecting times are shown in Table 5.

(Lot 2-3)

The same procedure as in Lot 2-2 was repeated, except for changing the amount of ethyl vinyl ether to be added dropwise to 14.5 parts by mass and not conducting the supplemental addition of ethyl vinyl ether. Samples thus obtained were used as standard samples 2-19 to 2-26 (1 part by mass). Relations between the standard samples and collecting times are shown in Table 6.

(Lot 2-4)

The same procedure as in Lot 2-1 was repeated, except for changing the amount of ethyl vinyl ether to be added dropwise to 22.7 parts by mass and not conducting the supplemental addition of ethyl vinyl ether. Samples thus obtained were used as standard samples 2-27 to 2-32 (1 part by mass). Relations between the standard samples and collecting times are shown in Table 7.

(Lot 2-5)

The same procedure as in Lot 2-2 was repeated, except for changing the amount of ethyl vinyl ether to be added dropwise to 22.6 parts by mass and the amount of supplemental ethyl vinyl ether to 0.9 parts by mass. Samples thus obtained were used as standard samples 2-33 to 2-40 (1 part by mass). Relations between the standard samples and collecting times are shown in Table 8.

(Lot 2-6)

The same procedure as in Lot 2-2 was repeated, except for changing the amount of ethyl vinyl ether to be added dropwise to 16.3 parts by mass and not conducting the supplemental addition of ethyl vinyl ether. Samples thus obtained were used as standard samples 2-41 to 2-46 (1 part by mass). Relations between the standard samples and collecting times are shown in Table 9.

(Lot 2-7)

The same procedure as in Lot 2-2 was repeated, except for changing the amount of ethyl vinyl ether to be added dropwise to 23.2 parts by mass and the amount of supplemental ethyl vinyl ether to 2.5 parts by mass. Samples thus obtained were used as standard samples 2-47 to 2-56 (1 part by mass). Relations between the standard samples and collecting times are shown in Table 10.

(Lot 2-8)

The same procedure as in Lot 2-1 was repeated, except for changing the amount of ethyl vinyl ether to be added dropwise to 21.7 parts by mass and the amount of supplemental ethyl vinyl ether to 1.8 parts by mass. Samples thus obtained were used as standard samples 2-57 to 2-62 (1 part by mass). Relations between the standard samples and collecting times are shown in Table 11.

(Lot 2-9)

The same procedure as in Lot 2-2 was repeated, except for changing the amount of ethyl vinyl ether to be added dropwise to 20.2 parts by mass and the amount of supplemental ethyl vinyl ether to 2.4 parts by mass. Samples thus obtained were used as standard samples 2-63 to 2-70 (1 part by mass). Relations between the standard samples and collecting times are shown in Table 12.

(Lot 2-10)

100 parts by mass of the same raw material polymer compound as used in Lot 2-1, 0.011 parts by mass of p-toluenesulfonic acid monohydrate and 600 parts by mass of methyl isobutyl ketone were mixed and stirred to obtain a mixture.

12.7 parts by mass of ethyl vinyl ether (protecting agent) was added, and the resultant mixture was stirred at 25° C.

Two samples were collected from the reaction mixture at 30 minutes after the addition. The collected samples were used as standard samples 2-71 to 2-72 (1 part by mass).

Thereafter, while stirring the reaction mixture at the same temperature, 2.9 parts by mass of ethyl vinyl ether was added, followed by stirring 30 more minutes (+60 minutes after) at the same temperature and, then, two samples were collected. The collected samples were used as standard samples 2-73 to 2-74 (1 part by mass).

Thereafter, while stirring the reaction mixture at the same temperature, 2.9 parts by mass of ethyl vinyl ether was added, followed by stirring 30 more minutes (+90 minutes after) at the same temperature and, then, two samples were collected. The collected samples were used as standard samples 2-75 to 2-76 (1 part by mass).

Thereafter, while stirring the reaction mixture at the same temperature, 2.9 parts by mans of ethyl vinyl ether was added, followed by stirring 30 more minutes (+120 minutes after) at the same temperature and, then, two samples were collected. The collected samples were used as standard samples 2-77 to 2-78 (1 part by mass).

Thereafter, while stirring the reaction mixture at the same temperature, 2.9 parts by mass of ethyl vinyl ether was added, followed by stirring 30 more minutes (+150 minutes after) at the same temperature and, then, two samples were collected. The collected samples were used as standard samples 2-79 to 2-80 (1 part by mass).

Thereafter, while stirring the reaction mixture at the same temperature, 2.9 parts by mass of ethyl vinyl ether was added, followed by stirring 80 more minutes (+230 minutes after) at the same temperature and, then, two samples were collected. The collected samples were used as standard samples 2-81 to 2-82 (1 part by mass).

Thereafter, while stirring the reaction mixture at the same temperature, 2.9 parts by mass of ethyl vinyl ether was added, followed by stirring 30 more minutes (+260 minutes after) at the same temperature and, then, two samples were collected. The collected samples were used as standard samples 2-83 to 2-84 (1 part by mass).

Thereafter, while stirring the reaction mixture at the same temperature, 2.9 parts by mass of ethyl vinyl ether was added, followed by stirring 30 more minutes (+290 minutes after) at the same temperature and, then, two samples were collected. The collected samples were used as standard samples 2-85 to 2-86 (1 part by mass).

Thereafter, while stirring the reaction mixture at the same temperature, 2.9 parts by mass of ethyl vinyl ether was added, followed by stirring 30 more minutes (+320 minutes after) at the same temperature and, then, two samples were collected. The collected samples were used as standard samples 2-87 to 2-88 (1 part by mass). Relations between the standard samples and collecting times are shown in Table 13.

(Lot 2-11)

The same procedure as in Lot 2-10 was repeated, except for using the raw material polymer compound same as that used in Lot 2-2 instead of the raw material polymer compound same as in Lot 2-1. Samples thus obtained were used as standard samples 2-89 to 2-106 (1 part by mass). Relations between the standard samples and collecting times are shown in Table 14.

(Quantification of Protective Ratio of Standard Sample According to NMR Method)

According to the same procedure as in Example 1, a polymer compound was obtained, and $^1$H-NMR spectrum thereof was measured. By the $^1$H-NMR spectrum, production of a polymer compound in which the protecting group (ethoxyethyl group) has been introduced into the hydroxyl groups of poly(p-vinylphenol) was confirmed. From the $^1$H-NMR spectrum, the protective ratios ($n_{i1}$, i=1 to 106) of the hydroxyl groups of the polymer compound were measured. The results are shown in Tables 4 to 14.

(Measurement of Near Infrared Absorption Spectrum of Standard Sample)

According to the same procedure as in Example 1, the near infrared absorption spectra ($r_1$ to $r_{106}$) of standard samples were obtained.

(Making of Multiple Regression Calibration Curve)

A matrix [R], a matrix [U] and a rank (M) were obtained according to Procedures 2 to 3, by setting the wave number range used for calculation of the near infrared absorption spectra ($r_1$ to $r_{106}$) of the standard samples obtained above within the range from 7500 to 6099 $cm^{-1}$ and performing a primary differential treatment and a smoothing treatment after performing the interval of the wave number for the calculation approximately 1 $cm^{-1}$ by supplementing the measured spectrum (data number was 1454) as previous treatments. M was 7.

A matrix [N] was obtained based on the above-mentioned formula (1-1) using the protective ratios ($n_{i1}$, i=1 to 106) of the standard samples obtained from the $^1$H-NMR spectrum, $n_{ik}$ (i is 1 to 106, k is 2 to 7) was 1.

According to the Procedure 4, [N'] was obtained, and according to the Procedure 5, an error (e) was measured to find it was 0.877.

Figure 6:
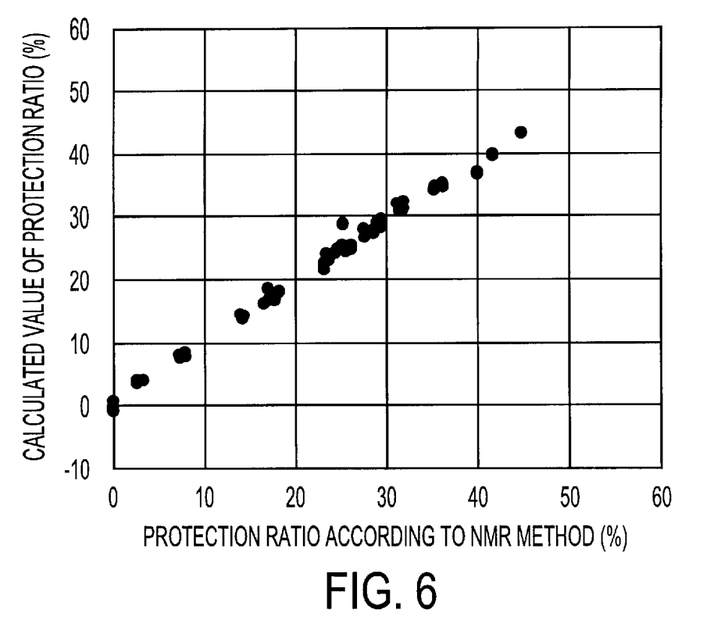
FIG. 6 is a view showing relation between the quantified values (abscissa) of the protective ratios of the standard samples obtained in Example 2 according to an NMR method and the calculated values (vertical axis) of the protective ratios calculated from a multiple regression calibration curve.

The relation of the protective ratios ($n_{i1}$, i=1 to 106) and the elements of the matrix [N'] is shown in FIG. 6. n'i1 are shown in Tables 4 to 14.

Then, a matrix [T] showing a multiple regression calibration curve was obtained according to the Procedure 7.

Errors (e) were obtained in the same manner as described above except for changing the wave number range used for calculation of spectra($r_i$ to $r_{106}$), and changing the previous treatments. Any of them was over 0.877.

TABLE 4

| Standard Sample | Lot | Collecting time | Protective ratio (%) $n_{i1}$ | Calculated value of protective ratio $n'_{i1}$ (%) | i |
|---|---|---|---|---|---|
| 2-1 | 2-1 | 0 hours after | 0 | 0.19 | 1 |
| 2-2 | 2-1 | 0 hours after | 0 | 0.21 | 2 |
| 2-3 | 2-1 | 1 hours after | 23.2 | 23.09 | 3 |
| 2-4 | 2-1 | 1 hours after | 23.2 | 23.00 | 4 |
| 2-5 | 2-1 | 2 hours after | 23.9 | 23.94 | 5 |
| 2-6 | 2-1 | 2 hours after | 23.9 | 23.74 | 6 |
| 2-7 | 2-1 | +1 hours after | 26.3 | 25.81 | 7 |
| 2-8 | 2-1 | +1 hours after | 26.3 | 25.84 | 8 |

TABLE 5

| Standard Sample | Lot | Collecting time | Protective ratio (%) $n_{i1}$ | Calculated value of protective ratio $n'_{i1}$ (%) | i |
|---|---|---|---|---|---|
| 2-9 | 2-2 | 0 hours after | 0.0 | −1.06 | 9 |
| 2-10 | 2-2 | 0 hours after | 0.0 | −1.06 | 10 |
| 2-11 | 2-2 | 1 hours after | 25.4 | 28.80 | 11 |
| 2-12 | 2-2 | 1 hours after | 25.4 | 28.82 | 12 |
| 2-13 | 2-2 | 2 hours after | 25.3 | 25.47 | 13 |
| 2-14 | 2-2 | 2 hours after | 25.3 | 25.32 | 14 |
| 2-15 | 2-2 | +1 hours after | 29.2 | 28.51 | 15 |
| 2-16 | 2-2 | +1 hours after | 29.2 | 28.29 | 16 |

TABLE 5-continued

| Standard Sample | Lot | Collecting time | Protective ratio (%) $n_{i1}$ | Calculated value of protective ratio $n'_{i1}$ (%) | i |
|---|---|---|---|---|---|
| 2-17 | 2-2 | +2 hours after | 28.6 | 28.73 | 17 |
| 2-18 | 2-2 | +2 hours after | 28.6 | 28.38 | 18 |

TABLE 6

| Standard Sample | Lot | Collecting time | Protective ratio (%) $n_{i1}$ | Calculated value of protective ratio $n'_{i1}$ (%) | i |
|---|---|---|---|---|---|
| 2-19 | 2-3 | 0 hours after | 0.0 | 0.25 | 19 |
| 2-20 | 2-3 | 0 hours after | 0.0 | 0.18 | 20 |
| 2-21 | 2-3 | 1 hours after | 16.7 | 16.76 | 21 |
| 2-22 | 2-3 | 1 hours after | 16.7 | 16.59 | 22 |
| 2-23 | 2-3 | 2 hours after | 17.2 | 18.74 | 23 |
| 2-24 | 2-3 | 2 hours after | 17.2 | 18.46 | 24 |
| 2-25 | 2-3 | 3 hours after | 16.9 | 16.45 | 25 |
| 2-26 | 2-3 | 3 hours after | 16.9 | 16.42 | 26 |

TABLE 7

| Standard Sample | Lot | Collecting time | Protective ratio (%) $n_{i1}$ | Calculated value of protective ratio $n'_{i1}$ (%) | i |
|---|---|---|---|---|---|
| 2-27 | 2-4 | 0 hours after | 0 | −0.54 | 27 |
| 2-28 | 2-4 | 0 hours after | 0 | −0.74 | 28 |
| 2-29 | 2-4 | 1 hours after | 24.3 | 24.72 | 29 |
| 2-30 | 2-4 | 1 hours after | 24.3 | 24.48 | 30 |
| 2-31 | 2-4 | 2 hours after | 25.9 | 25.74 | 31 |
| 2-32 | 2-4 | 2 hours after | 25.9 | 26.47 | 32 |

TABLE 8

| Standard Sample | Lot | Collecting time | Protective ratio (%) $n_{i1}$ | Calculated value of protective ratio $n'_{i1}$ (%) | i |
|---|---|---|---|---|---|
| 2-3 | 2-5 | 0 hours after | 0.0 | 0.40 | 33 |
| 2-4 | 2-5 | 0 hours after | 0.0 | 0.46 | 34 |
| 2-5 | 2-5 | 1 hours after | 27.6 | 27.49 | 35 |
| 2-6 | 2-5 | 1 hours after | 27.6 | 27.27 | 36 |
| 2-7 | 2-5 | 2 hours after | 28.7 | 28.27 | 37 |
| 2-8 | 2-5 | 2 hours after | 28.7 | 28.09 | 38 |
| 2-9 | 2-5 | +1 hours after | 29.8 | 29.78 | 39 |
| 2-0 | 2-5 | +1 hours after | 29.8 | 29.40 | 40 |

TABLE 9

| Standard Sample | Lot | Collecting time | Protective ratio (%) $n_{i1}$ | Calculated value of protective ratio $n'_{i1}$ (%) | i |
|---|---|---|---|---|---|
| 2-41 | 2-6 | 0 hours after | 0.0 | −0.09 | 41 |
| 2-42 | 2-6 | 0 hours after | 0.0 | −0.52 | 42 |
| 2-43 | 2-6 | 1 hours after | 17.4 | 17.81 | 43 |
| 2-44 | 2-6 | 1 hours after | 17.4 | 17.32 | 44 |
| 2-45 | 2-6 | 2 hours after | 17.9 | 18.15 | 45 |
| 2-46 | 2-6 | 2 hours after | 17.9 | 17.61 | 46 |

TABLE 10

| Standard Sample | Lot | Collecting time | Protective ratio (%) $n_{i1}$ | Calculated value of protective ratio $n'_{i1}$ (%) | i |
|---|---|---|---|---|---|
| 2-47 | 2-7 | 0 hours after | 0.0 | 0.21 | 47 |
| 2-48 | 2-7 | 0 hours after | 0.0 | −0.13 | 48 |
| 2-49 | 2-7 | 1 hours after | 27.6 | 28.02 | 49 |
| 2-50 | 2-7 | 1 hours after | 27.6 | 27.52 | 50 |
| 2-51 | 2-7 | 2 hours after | 27.8 | 28.74 | 51 |
| 2-52 | 2-7 | 2 hours after | 27.8 | 28.88 | 52 |
| 2-53 | 2-7 | +1 hours after | 31.5 | 32.14 | 53 |
| 2-54 | 2-7 | +1 hours after | 31.5 | 31.67 | 54 |
| 2-55 | 2-7 | +2 hours after | 32.1 | 32.96 | 55 |
| 2-56 | 2-7 | +2 hours after | 32.1 | 32.62 | 56 |

TABLE 11

| Standard Sample | Lot | Collecting time | Protective ratio (%) $n_{i1}$ | Calculated value of protective ratio $n'_{i1}$ (%) | i |
|---|---|---|---|---|---|
| 2-57 | 2-8 | 1 hours after | 23.3 | 22.63 | 57 |
| 2-58 | 2-8 | 1 hours after | 23.3 | 22.02 | 58 |
| 2 59 | 2-8 | 2 hours after | 23.4 | 22.96 | 59 |
| 2-60 | 2-8 | 2 hours after | 23.4 | 22.40 | 60 |
| 2-61 | 2-8 | +1 hours after | 25.8 | 25.96 | 61 |
| 2-62 | 2-8 | +1 hours after | 25.3 | 25.34 | 62 |

TABLE 12

| Standard Sample | Lot | Collecting time | Protective ratio (%) $n_{i1}$ | Calculated value of protective ratio $n'_{i1}$ (%) | i |
|---|---|---|---|---|---|
| 2-63 | 2-9 | 1 hours after | 24.8 | 25.32 | 63 |
| 2-64 | 2-9 | 1 hours after | 24.8 | 24.85 | 64 |
| 2-65 | 2-9 | 2 hours after | 25.6 | 25.75 | 65 |
| 2-66 | 2-9 | 2 hours after | 25.6 | 25.14 | 66 |
| 2-67 | 2-9 | 3 hours after | 26.4 | 25.96 | 67 |
| 2-68 | 2-9 | 3 hours after | 26.4 | 25.31 | 68 |
| 2-69 | 2-9 | +1 hours after | 29.5 | 30.11 | 69 |
| 2-70 | 2-9 | +1 hours after | 29.5 | 29.52 | 70 |

TABLE 13

| Standard Sample | Lot | Collecting time | Protective ratio (%) $n_{i1}$ | Calculated value of protective ratio $n'_{i1}$ (%) | i |
|---|---|---|---|---|---|
| 2-71 | 2-10 | 30 minutes after | 3.0 | 3.93 | 71 |
| 2-72 | 2-10 | 30 minutes after | 3.0 | 3.26 | 72 |
| 2-73 | 2-10 | 60 minutes after | 8.1 | 8.47 | 78 |
| 2-74 | 2-10 | 60 minutes after | 8.1 | 7.89 | 74 |
| 2-75 | 2-10 | 90 minutes after | 14.4 | 14.62 | 75 |
| 2-76 | 2-10 | 90 minutes after | 14.4 | 14.04 | 76 |
| 2-77 | 2-10 | 120 minutes after | 18.0 | 17.93 | 77 |
| 2-78 | 2-10 | 120 minutes after | 18.0 | 17.36 | 78 |
| 2-79 | 2-10 | 150 minutes after | 23.3 | 22.98 | 79 |
| 2-80 | 2-10 | 150 minutes after | 23.3 | 22.64 | 80 |
| 2-81 | 2-10 | 230 minutes after | 29.1 | 29.81 | 81 |
| 2-82 | 2-10 | 280 minutes after | 29.1 | 29.48 | 82 |
| 2-83 | 2-10 | 260 minutes after | 31.4 | 32.74 | 83 |
| 2-84 | 2-10 | 260 minutes after | 31.4 | 32.51 | 84 |
| 2-85 | 2-10 | 290 minutes after | 86.3 | 36.22 | 85 |
| 2-86 | 2-10 | 290 minutes after | 36.3 | 35.80 | 86 |
| 2-87 | 2-10 | 320 minutes after | 41.8 | 41.12 | 87 |
| 2-88 | 2-10 | 320 minutes after | 41.8 | 40.67 | 88 |

TABLE 14

| Standard Sample | Lot | Collecting time | Protective ratio (%) $n_{i1}$ | Calculated value of protective ratio $n'_{i1}$ (%) | i |
|---|---|---|---|---|---|
| 2-89 | 2-11 | 30 minutes after | 3.5 | 3.95 | 89 |
| 2-90 | 2-11 | 30 minutes after | 8.5 | 3.46 | 90 |
| 2-91 | 2-11 | 60 minutes after | 7.6 | 8.20 | 91 |
| 2-92 | 2-11 | 60 minutes after | 7.6 | 7.61 | 92 |
| 2-93 | 2-11 | 90 minutes after | 14.1 | 14.78 | 93 |
| 2-94 | 2-11 | 90 minutes after | 14.1 | 14.26 | 94 |
| 2-95 | 2-11 | 120 minutes after | 18.4 | 18.51 | 95 |
| 2-96 | 2-11 | 120 minutes after | 18.4 | 18.20 | 96 |
| 2-97 | 2-11 | 150 minutes after | 23.5 | 24.59 | 97 |
| 2-98 | 2-11 | 150 minutes after | 23.5 | 24.01 | 98 |
| 2-99 | 2-11 | 230 minutes after | 32.0 | 31.94 | 99 |
| 2-100 | 2-11 | 230 minutes after | 32.0 | 31.59 | 100 |
| 2-101 | 2-11 | 260 minutes after | 35.4 | 35.74 | 101 |
| 2-102 | 2-11 | 260 minutes after | 85.4 | 35.21 | 102 |
| 2-103 | 2-11 | 290 minutes after | 40.1 | 38.02 | 103 |
| 2-104 | 2-11 | 290 minutes after | 40.1 | 37.66 | 104 |
| 2-105 | 2-11 | 320 minutes after | 44.7 | 44.53 | 105 |
| 2-106 | 2-11 | 320 minutes after | 44.7 | 44.51 | 106 |

(Preparation of Sample)

100 parts by mass of a copolymer of p-vinylphenol and cyclohexyl acrylate (raw material polymer compound, weight-average molecular weight is 13000, the molar ratio of the unit derived from p-vinylphenol, the first structural unit, was 90% and the molar ratio of the unit derived from cyclohexyl acrylate, the other structural unit, was 10%), 0.011 parts by mass of p-toluenesulfonic acid monohydrate (catalyst) and 600 parts by mass of methyl isobutyl ketone (solvent) were mixed and stirred to obtain a mixture.

13.0 parts by mass of ethyl vinyl ether (protecting agent) was added dropwise over 30 minutes to the mixture obtained above while stirring. Then, the samples were collected from the reaction mixture each at 1 hour and 2 hours after completion of addition, while stirring the mixture at 25° C., and the collected samples were used as standard samples 2-107 to 2-108 (1 part by mass).

Thereafter, same temperature was kept for 1 hour while stirring, and then 2.2 parts by mass of ethyl vinyl ether was added to the reaction mixture while stirring at the same temperature. Two samples were collected from the reaction mixture at 1 hour after completion of the supplemental addition. One of the collected samples was used as a standard sample 2-109.

Relations between the standard samples and collecting time are shown in Table 15.

(Quantification of Protective Ratio According to NMR Method)

$^1$H-NMR spectra of the samples 2-107 to 2-109 were measured in the same manner as for the above-mentioned standard samples, and the protective ratios were obtained. The results are shown in Table 15.

(Quantification of Protective Ratio Using Multiple Regression Calibration Curve)

The near infrared absorption spectra (x) of the samples 2-107 to 2-109 were obtained in the same manner as for the above-mentioned standard samples, and the protective ratios (y) were calculated according to the formula (2) using data within the numerical range from 7500 to 6099 cm$^{-1}$ (data number was 1454) among the spectra (x) and by performing a primary differential treatment and a smoothing treatment as a previous treatment. The results are shown in Table 3. The times required for measurement of the near infrared absorption spectrum were 30 seconds or shorter. In performing the previous treatment on the spectrum (x) and calculating the protective ratio, a usual personal computer was used, and the protective ratio could be calculated approximately in an instant.

TABLE 15

| Sample No. | Collecting time | Protective ratio (%) NMR method | Protective ratio (%) Y |
|---|---|---|---|
| 2-107 | 1 hour after | 12.6 | 12.8 |
| 2-108 | 2 hours after | 13.7 | 13.2 |
| 2-109 | +1 hours after | 17.2 | 16.9 |

As shown in Table 15, the calculated value of the protective ratio (y) calculated using a multiple regression calibration curve from the near infrared absorption spectrum (x) of a sample coincides with the quantified value of the protective ratio according to an NMR method.

What is claimed is:

1. A method of quantifying the protective ratio of the hydroxyl groups of a polymer compound, comprising calculating the protective ratio of the hydroxyl groups of the polymer compound using a multiple regression calibration curve obtained by regression-analyzing main components of near infrared absorption spectra of a plurality of standards samples, from near infrared absorption spectra of samples containing a polymer compound composed of the following first structural unit and second structural unit:

first structural unit: a structural unit of the general formula (1), second structural unit: a structural unit of the structure obtained by introducing a protecting group into the hydroxyl group in the first structural unit.

2. The method according to claim 1 wherein the protecting group is selected from alkoxyalkyl groups, alkylcarbonyl groups, arylcarbonyl groups, alkyl groups and alkoxycarbonyl groups.

3. A method for producing a polymer compound composed of a first structural unit, which is a structural unit of the general formula (1).

and a second structural unit, which is a structural unit of a structure obtained by introducing a protecting group into a hydroxyl group in the first structural unit, and having an intended protective ratio, which comprises
reacting a raw material polymer compound composed of the first structural unit with a protecting agent,
calculating the protective ratio of the hydroxyl groups of the polymer compound contained in a reaction mixture using a multiple regression calibration curve obtained by regression-analyzing main components of near infrared absorption spectra of a plurality of standards samples, from the near infrared absorption spectrum (x) of the reaction mixture during the reaction and terminating the reaction based on the protective ratio.

4. A method for producing a polymer compound composed of a first structural unit, which is a structural unit of the general formula (1), (I)

and a second structural unit, which is a structural unit of a structure obtained by introducing a protecting group into a hydroxyl group in the first structural unit, and having an intended protective ratio, which comprises releasing a protecting group from a raw material polymer compound composed of the second structural unit, calculating the protective ratio of the hydroxyl groups of the polymer compound contained in a reaction mixture using a multiple regression calibration curve, from the near infrared absorption spectrum (x) of the reaction mixture during the reaction and terminating the reaction based on the resulted protective ratio.

5. The method according to claims 1, 3 or 4 wherein the protecting group is selected from alkoxyalkyl groups, alkylcarbonyl groups, arylcarbonyl groups, alkyl groups and alkoxycarbonyl groups.

* * * * *